US012508830B2

(12) United States Patent
Humenick et al.

(10) Patent No.: US 12,508,830 B2
(45) Date of Patent: Dec. 30, 2025

(54) SYSTEMS AND METHODS FOR AN ENCLOSED DYE SUBLIMATION APPARATUS

(71) Applicant: Sekisui Kydex, LLC, Bloomsburg, PA (US)

(72) Inventors: Jeffrey Humenick, Bloomsburg, PA (US); Jym Kauffman, Bloomsburg, PA (US); Rebecca Gallup, Bloomsburg, PA (US)

(73) Assignee: Sekisui Kydex, LLC, Bloomsburg, PA (US)

( * ) Notice: Subject to any disclaimer, the term of this patent is extended or adjusted under 35 U.S.C. 154(b) by 334 days.

(21) Appl. No.: 17/874,705

(22) Filed: Jul. 27, 2022

(65) Prior Publication Data

US 2023/0040029 A1 Feb. 9, 2023

Related U.S. Application Data

(60) Provisional application No. 63/229,953, filed on Aug. 5, 2021.

(51) Int. Cl.
*B41M 5/382* (2006.01)
*B41M 5/035* (2006.01)

(52) U.S. Cl.
CPC .......... *B41M 5/382* (2013.01); *B41M 5/0358* (2013.01); *B41M 5/38221* (2013.01)

(58) Field of Classification Search
CPC .......................... B41M 5/382; B41M 5/0358; B41M 5/38221; B41J 2/475; D06P 5/004; D06P 5/00
See application file for complete search history.

(56) References Cited

U.S. PATENT DOCUMENTS 5,644,351 A 7/1997 Matsumoto et al.
8,450,655 B2 * 5/2013 Chao .................... B41F 16/008 392/407
8,609,583 B2 12/2013 Hoggard
(Continued)

FOREIGN PATENT DOCUMENTS

CA 2039054 A1 10/1991
EP 451067 A * 10/1991 .......... B41M 5/0358
(Continued)

OTHER PUBLICATIONS

International Search Report and Written Opinion on PCT Appl. Ser. No. PCT/US2022/038160 dated Oct. 14, 2022 (9 pages).
(Continued)

*Primary Examiner* — Douglas X Rodriguez
*Assistant Examiner* — Tracey M Mcmillion
(74) *Attorney, Agent, or Firm* — Foley & Lardner LLP

(57) ABSTRACT

An illustrative dye sublimation apparatus may include a sealed chamber and a heating section. More specifically, the sealed chamber is thermally insulated and substantially airtight in order to keep the heat generated by the heating section within the sealed chamber. Compared to the conventional systems that are open-air and require direct heat, the embodiments disclosed herein generate a uniform or nearly uniform heat distribution throughout the sealed chamber, which results in a more consistent and efficient dye sublimation process.

10 Claims, 5 Drawing Sheets

200

(56) References Cited

U.S. PATENT DOCUMENTS

| | | | | |
|---|---|---|---|---|
| 2005/0248649 | A1* | 11/2005 | Farrell | D06P 5/004 347/216 |
| 2011/0229664 | A1* | 9/2011 | Hoggard | B41F 16/00 428/32.6 |
| 2012/0196085 | A1 | 8/2012 | Langan et al. | |
| 2015/0029289 | A1 | 1/2015 | Rosner et al. | |

FOREIGN PATENT DOCUMENTS

| | | | | |
|---|---|---|---|---|
| JP | H1150381 | A * | 2/1999 | D06P 5/00 |
| JP | 3628937 | B2 | 3/2005 | |
| JP | 2007-261602 | A | 10/2007 | |
| WO | WO-2005/105470 | A1 | 11/2005 | |
| WO | WO-2020/162958 | A1 | 8/2020 | |

OTHER PUBLICATIONS

International Preliminary Report on Patentability for PCT App. PCT/US2022/038160 dated Feb. 6, 2024 (7 pages).

GB Examination Report for Application No. 2401560.4 mailing date May 27, 2025, 1 page.

* cited by examiner

100

300

400

500

SYSTEMS AND METHODS FOR AN ENCLOSED DYE SUBLIMATION APPARATUS

CROSS-REFERENCE TO RELATED APPLICATIONS

This application claims the benefit of and priority to U.S. Provisional Application No. 63/229,953, filed Aug. 5, 2021, the entire disclosure of which is incorporated by reference herein.

TECHNICAL FIELD

This application is directed generally towards a dye sublimation apparatus (also referred to as a dye sublimation machine) and more specifically towards systems and methods for an enclosed dye sublimation machine.

BACKGROUND

Dye sublimation is a process of infusing images to a substrate. An image to be infused is printed on a paper (or any type of sheet) using sublimation dyes (contained in the sublimation inks) and the printed paper is pressed against a substrate under heat. The heat causes the dyes to sublimate from a solid state on the printed paper to a gaseous state to travel to the substrate, where the dyes are deposited as solids. This sublimation process therefore infuses the image in the printed paper into the substrate. As the infused image is embedded within the substrate, the image may not chip, fade, or delaminate like capped and printed images.

A dye sublimation apparatus may have a heating section to generate the heat for sublimating the dyes such that the dye can travel from the printed paper (or printed sheet) into the substrate. For example, FIG. 1 shows a conventional heating section 100 of a conventional dye sublimation apparatus. As shown, the heating section 100 includes a bank of heaters 102 containing individual heaters 102*a*, 102*b*, 102*c*, 102*d*. The bank of heaters may generate a radiating heat 106 to heat a printed sheet 104.

However, the aforementioned conventional method of using a bank of heaters 102 has several technical shortcomings. For example, utilizing the bank of heaters 102 can lead to uneven heating across the substrate, as there may be gaps in coverage between the individual heaters 102*a*, 102*b*, 102*c*, 102*d*. More generally, generating direct heat from the bank of heaters 102 is somewhat inefficient and restricts the pool of options for heating sources.

As such, a significant improvement upon even and efficient heating sections of dye sublimation machines is desired.

SUMMARY

What is therefore desired are dye sublimation systems and methods with more efficient, even, and versatile heating sections. What is further desired are dye sublimation systems and methods that provide efficient and even heating across the printed sheet and substrate combination throughout the heating cycle.

Embodiments described herein attempt to solve the aforementioned technical problems and may provide other benefits as well. An illustrative dye sublimation machine (also referred to as a dye sublimation apparatus) may be an enclosed dye sublimation machine, such that the dye sublimation machine features a sealed chamber with one or more doors that can be opened to insert a printed sheet and substrate combination. The sealed chamber may feature a plurality of heating sections, including a bank of heaters, a single direct heat source, or one or more indirect heat sources. Because the sealed chamber is sealed, the heating section is able to maintain a substantially constant temperature, which provides even heat across the printed sheet and substrate. Furthermore, because there is no need to power and manage multiple different heaters across a bank of heaters, the enclosed dye sublimation machine is more efficient to operate.

In one embodiment, a dye sublimation apparatus for infusing an image on a printed sheet to a substrate, the dye sublimation apparatus comprises a sealed chamber configured to receive the printed sheet and substrate; the sealed chamber comprising a heating section configured to heat the printed sheet to sublimate one or more dyes forming the image, such that the one or more dyes travel to the substrate in a gaseous state and deposit into the substrate in a solid state to infuse the image into the substrate; and the heating section further comprising one or more heaters configured to radiate heat throughout the sealed chamber.

In another embodiment, a dye sublimation method for infusing an image on a printed sheet to a substrate comprises sealing, via a sealed chamber of a dye sublimation apparatus, the printed sheet and the substrate in an enclosed space; heating, by a heating section of the dye sublimation apparatus, the printed sheet and the substrate, such that the one or more dyes travel to the substrate in a gaseous state and deposit into the substrate in a solid state to infuse the image into the substrate; and the heating section further comprising one or more heaters configured to radiate heat throughout the sealed chamber.

It is to be understood that both the foregoing general description and the following detailed description are exemplary and explanatory and are intended to provide further explanation of the disclosed embodiment and subject matter as claimed.

BRIEF DESCRIPTION OF THE DRAWINGS

The accompanying drawings constitute a part of this specification and illustrate embodiments of the subject matter disclosed herein.

DETAILED DESCRIPTION

Figure 1:
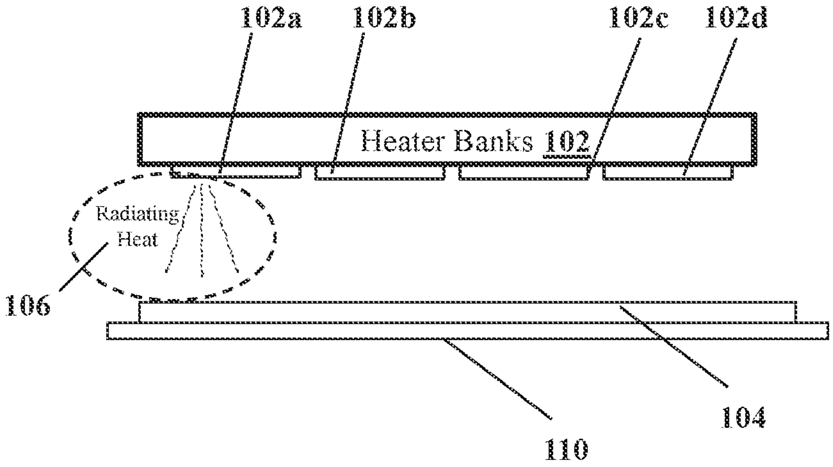
FIG. 1 PRIOR ART
FIG. 1 shows an example of a heating section of a conventional dye sublimation apparatus.

Reference will now be made to the illustrative embodiments illustrated in the drawings, and specific language will be used here to describe the same. It will nevertheless be understood that no limitation of the scope of the claims or this disclosure is thereby intended. Alterations and further modifications of the inventive features illustrated herein, and additional applications of the principles of the subject matter illustrated herein, which would occur to one ordinarily skilled in the relevant art and having possession of this disclosure, are to be considered within the scope of the subject matter disclosed herein. The present disclosure is here described in detail with reference to embodiments illustrated in the drawings, which form a part here. Other embodiments may be used and/or other changes may be made without departing from the spirit or scope of the present disclosure. The illustrative embodiments described in the detailed description are not meant to be limiting of the subject matter presented here.

Embodiments disclosed herein describe an improved dye sublimation machine with a more efficient and versatile ability to heat a printed sheet and substrate combination through a sealed chamber and one of many options for a source of heat. More specifically, the dye sublimation machine may feature a sealed chamber into which the printed sheet and substrate combination is inserted. The improved dye sublimation machine features one or more heating elements that, when combined with the sealed nature of the chamber, provide an even and efficient heat across the printed sheet and substrate combination. These heating sources may provide direct or indirect heat and may be located at various locations throughout the sealed chamber.

Figure 2:
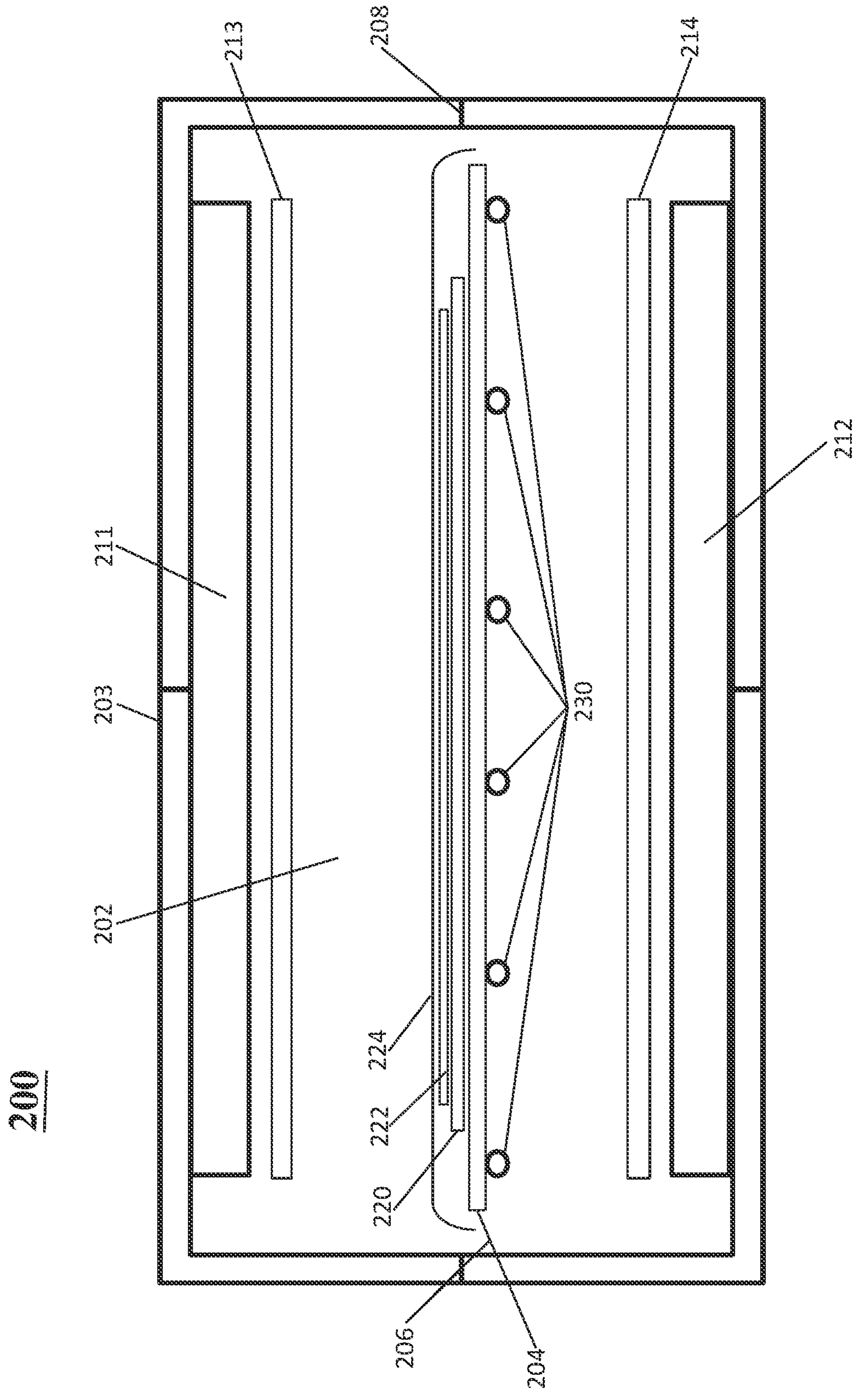
FIG. 2 shows an illustrative dye sublimation apparatus, according to an embodiment.

FIG. 2 shows an illustrative dye sublimation machine (also referred to as dye sublimation apparatus) 200, according to an embodiment. It should be understood that the dye sublimation machine 200 shown in FIG. 2 and described herein is merely for illustration and explanation and machines with other form factors and components should also be considered within the scope of this disclosure. For example, dye sublimation machines having additional, alternative, or a fewer number of components than the illustrative dye sublimation machine 200 should be included within the scope of this disclosure.

The dye sublimation machine 200 may comprise a sealed chamber 202, which is sealed (or substantially sealed) to prevent the escape of heat energy. The seal for the sealed chamber 202 comprises a wall 203 that surrounds the sealed chamber 202 and, in some embodiments, completely encloses the sealed chamber 202. The wall 203 is thermally-insulated to keep heat energy within the sealed chamber 202.

The dye sublimation machine 200 may comprise a sublimation table 204, which may provide structural support for the components of the dye sublimation machine 200. The dye sublimation machine 200 features a first opening 206 that may be altered from a closed (i.e., sealed) position to an open position in order to allow a worker (or a user) to load a printed sheet 222 and a substrate 220. In some embodiments, the dye sublimation machine 200 further features a second opening 208 that functions similarly to the first opening 206 but is positioned directly opposite of the first opening 206, such that the printed sheet 222 and substrate 220 may be inserted into the dye sublimation machine via the first opening 206 and removed via the second opening 208, or vice versa. Each of the first opening 206 and second opening 208 may be any type of adjustable opening, such as a slot, door, or gap. The first and second openings 206-208 are configured to move from a closed position in which the seal for the sealed chamber is maintained to an open position in which the seal for the sealed chamber is broken, such as via a hinge or sliding mechanism. For example, the first opening is structured as a hinged door that rotates around a central hinge from a closed position to an open position. Furthermore, the first and second openings 206-208 are large enough to, when in the open position, allow for the printed sheet 222 and substrate 220 to pass through.

The printed sheet 222 may have an image thereon printed using sublimation inks containing sublimation dyes. The substrate 220 may be of any type of material such as thermoplastic where the image may be infused through the dye sublimation process. The combination of the printed sheet 222 and the substrate 220 may be loaded onto the sublimation table 204, which may be formed by a graphite honeycomb structure.

The dye sublimation machine 200 may comprise one or more heater elements. As shown in FIG. 2, the dye sublimation machine 200 comprises a first heater element 211 positioned above the sublimation table 204 and a second heater element 212 positioned below the sublimation table 204. Although the illustrative dye sublimation machine 200 is shown to comprise two heater elements positioned above and below the sublimation table 204, any number of heater elements (e.g., a single heater element, three heater elements, etc.) may be included and may be located anywhere throughout the sealed chamber 202 (e.g., a single heater element located below the sublimation table 204). Each of the first and second heater elements 211-212 may further comprise a first heat diffuser 213 and a second heat diffuser 214 structured to redirect heat from the first and second heater elements 211-212. Because the sealed chamber 202 is sealed, any heat energy within the sealed chamber 202 is going to substantially remain within the sealed chamber 202. As a result, the first and second heater elements 211-212 can provide heat energy to the printed sheet 222 and substrate 220 combination without directly heating (i.e., heat energy from the heater element traveling unimpeded) the printed sheet 222 and substrate 220 combination. Furthermore, because direct heat can often lead to uneven heating since heat energy is strongest closest to the heater element and decreases in strength away from the heater element, by redirecting the heat energy from the first and second heater elements 211-212, the first and second heat diffusers 213-214 improve the heating ability of the first and second heater elements 211-212 by converting the direct heat energy to more even indirect heat energy.

The first and second heater elements 211-212 may be of any kind such as heating coils in any type configuration. The first and second heater elements 211-212 may be electrically heated providing a radiative type heating to the combination of the printed sheet 222 and the substrate 220. For example, the first and second heater elements 211-212 may be included in multiple electrical heaters, each heating a section of the combination of the printed sheet 222 and the substrate 220. The sealed chamber 202 may include one or more sensors (e.g., pyrometers) to measure the temperature of the heat generated by the first and second heater elements 211-212. The first and second heater elements 211-212 may be within individual heaters that may be individually controlled by one or more controllers. For example, a controller associated with a heater may receive a temperature measurement from the sensors and determine the amount of heat to be radiated by the heater. The first and second heater elements 211-212 may also be divided into a plurality of zones, each zone containing one or more heaters. Therefore, a corresponding controller may individually control the heat output of each zone to maintain a consistent temperature within the sealed chamber.

In some embodiments, such as the embodiment shown in FIG. 2, the dye sublimation machine 200 further comprises a plurality of grates 230 that are structured to relieve pressure from the sealed chamber 202. Because temperature and pressure are directly correlated for a closed environment (e.g., as temperature rises, so too does pressure), as the temperature within the sealed chamber 202 increases due to the first and second heater elements 211-212, the plurality of grates 230 are vented to allow pressure to dissipate without losing heat energy.

Within the sealed chamber 202, a membrane 224 may cover the combination of the printed sheet 222 and the substrate 220. The membrane 224 may be formed by any kind of material that may withstand the heat for repeated heating cycles in the sealed chamber 202. A vacuum or pump may pull down the membrane 224 such that the membrane 224 may cover the combination of the printed sheet 222 and the substrate 220 snugly without air bubbles In an illustrative operation, a worker may open the first opening 206, place the substrate 220 on the sublimation table 204, place the printed sheet 222 directly into the substrate 220, and close the first opening 206. Within the sealed chamber 202, the vacuum pump may pull a vacuum between the membrane 224 and the sublimation table 204 such that the membrane 224 presses down on the printed sheet 222. The first and second heater elements 211-212 may generate a requisite amount heat to sublimate the ink on the printed sheet 222. The sublimated ink may then be deposited into the substrate 220. The sensors may measure the temperature at different spots within the enclosure created by the membrane 224 and the sublimation table 204 and the temperature measurements may be used by the first and second heater elements 211-212 to regulate the generated heat. After the combination of the printed sheet 222 and the substrate 220 are left in the sealed chamber 202 for a requisite amount of time (e.g., based upon the properties of the substrate 220), the worker opens the first opening 206 (or second opening 208) and removes the combination of the printed sheet 222 and the substrate 220. After this process, the image in the printed sheet 222 is infused (or deposited) into the substrate 220.

Figure 3:
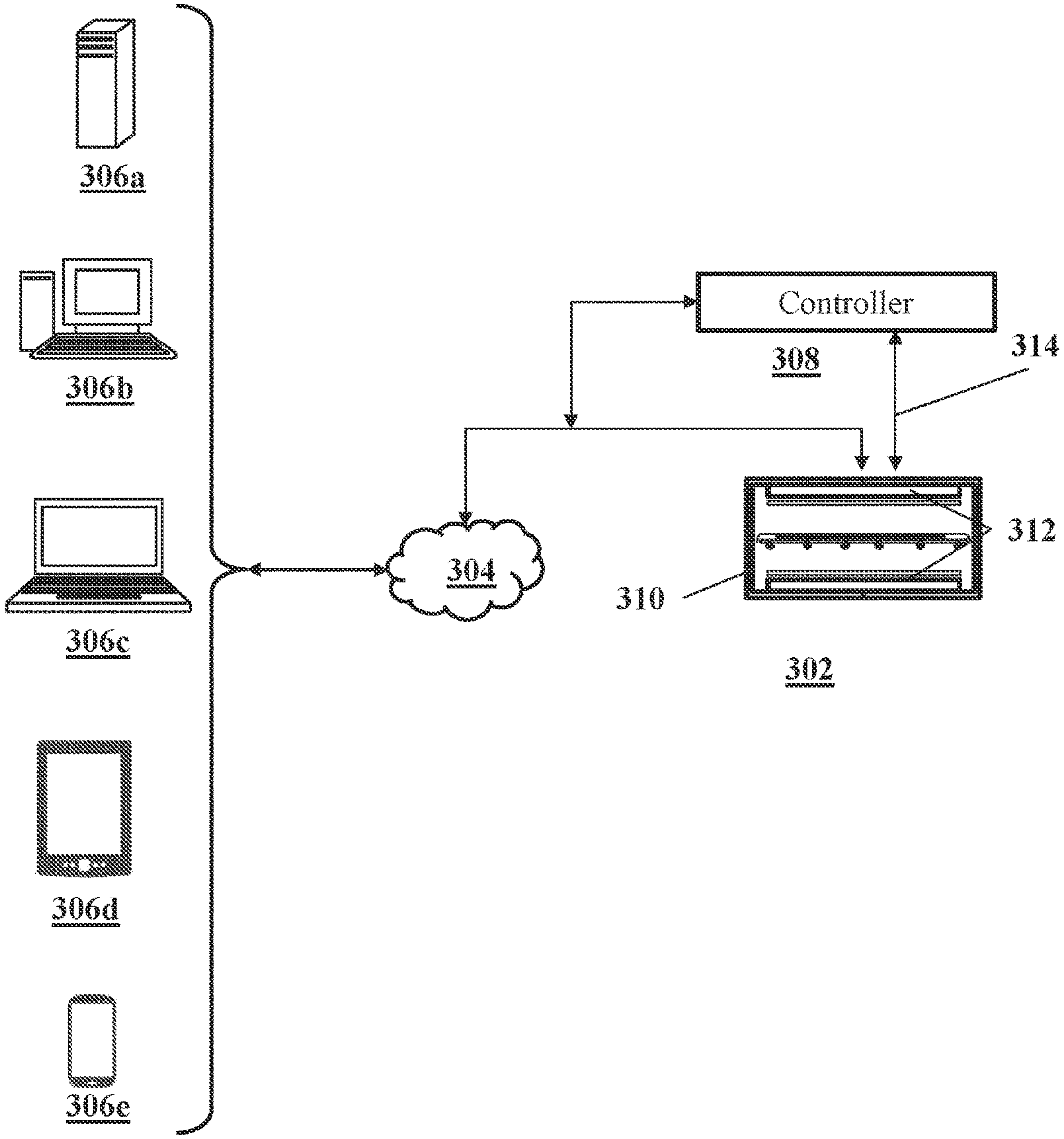
FIG. 3 shows an illustrative system for dye sublimation, according to an embodiment.

FIG. 3 shows an illustrative system 300 for dye sublimation, according to an embodiment. As shown, the system 300 may comprise a dye sublimation apparatus (also referred to as a dye sublimation machine) 302, a network 304, computing devices 306*a*, 306*b*, 306*c*, 306*d*, 306*e* (collectively or commonly referred to as 306), and a controller 308. It should be understood that the system 300 and the aforementioned components are merely for illustration and systems with additional, alternative, and a fewer number of components should be considered within the scope of this disclosure.

The dye sublimation apparatus 302 may be a combination of components that may infuse (or dye sublimate) an image from a printed sheet to a substrate. The image may be printed using sublimation inks containing sublimation dyes that may transform from solid state to gaseous state when heated to a predetermined temperature. The sublimation dyes may travel to the substrate and deposit therein thereby creating an infused image within the substrate. For the heating part of the dye sublimation process, the dye sublimation apparatus 302 may include a sealed chamber 310. The heating section may generally be enclosed for temperature control and to preempt the heat escaping the dye sublimation apparatus 302. The sealed chamber 310 may include a plurality of heaters 312, which may be organized into different zones with each zone containing one or more heaters.

The plurality of heaters 312 may be controlled by a controller 308. The single controller 308 is shown merely for illustration and there may be a plurality of controllers 308 controlling the plurality of heaters (also referred to as heater banks) 312. More particularly, the controller 308 may regulate the heat generated by each zone (containing one or more heaters) individually. For example, the controller 308 may increase the heat, decrease the heat, turn ON, or turn OFF the heat generated by a zone by controlling the corresponding heater. The controller 308 may be any kind of hardware and/or software controller, including, but not limited to PID (proportional-integral-derivative) controller and/or any other type of controller. The controller 308 may continuously receive a feedback from the items being heated (e.g., printed sheet, substrate) through a connection 314. The connection 314 may be wired, e.g., a wired connection from a plurality of sensors providing the feedback to the controller 308, or wireless, e.g., a plurality of sensors wirelessly providing the feedback to the controller 308.

In addition to the controller 308, the plurality of heaters 312 may be controlled based upon instructions provided by a computing device 306. For example, the computing device 306 may include an interface for a user to enter a desired amount of bed temperature in the sealed chamber 310 for a particular image and the computing device 306 may provide instructions to the plurality of heaters 312 through the network 304 to maintain the temperature throughout the sealed chamber 310. Alternatively or additionally, the computing device 306 may provide the instruction to maintain the temperature to the controller 308. In some embodiments, the computing device 306 may provide instructions to the plurality of heaters 312 to maintain a first temperature for the sealed chamber 310 at a first stage of the dye sublimation process and to maintain a second temperature for the sealed chamber 310 at a second stage of the dye sublimation process. It should be understood that the instructions to maintain the temperature and the process of maintaining the temperature may be maintained either in hardware, e.g., through the controller 308, or as a combination of hardware and software, e.g., through one or more applications in the computing device 306, the controller 308, and/or other hardware components in the dye sublimation apparatus. In some embodiments, the controller 308 may sequentially activate the heaters in the plurality of heaters 312. For example, the dye sublimation process may require a gradual ramping up of the heat and therefore the sequential activation may allow heat to build up to a desired temperature.

As described above, the dye sublimation apparatus 302 includes one or more temperature sensors throughout the sealed chamber 310. The temperature sensors may be oriented towards various spots within the sealed chamber 310 to measure the corresponding temperature and confirm that the plurality of heaters 312 are providing even heat throughout the sealed chamber.

The computing devices 306 may include any type processor-based device that may execute one or more instructions (e.g., instructions to cause a uniform temperature distribution in the sealed chamber 310) to the dye sublimation apparatus 302 through the network 304. Non-limiting examples of the computing devices 306 include a server 306*a*, a desktop computer 306*b*, a laptop computer 306*c*, a tablet computer 306*d*, and a smartphone 306*e*. However, it should be understood that the aforementioned devices are merely illustrative and other computing devices should also be considered within the scope of this disclosure. At minimum, each computing device 306 may include a processor and non-transitory storage medium that is electrically connected to the processor. The non-transitory storage medium may store a plurality of computer program instructions (e.g., operating system, applications) and the processor may execute the plurality of computer program instructions to implement the functionality of the computing device 306.

The network 304 may be any kind of local or remote network that may provide a communication medium between the computing devices 306 and the dye sublimation apparatus 302. For example, the network 304 may be a local area network (LAN), a desk area network (DAN), a metropolitan area network (MAN), or a wide area network (WAN). However, it should be understood that aforementioned types of networks are merely illustrative and any type of component providing the communication medium between the computing devices 306 and the dye sublimation apparatus 302 should be considered within the scope of this disclosure. For example, the network 304 may be a single wired connection between a computing device 306 and the dye sublimation apparatus 302.

Figure 4:
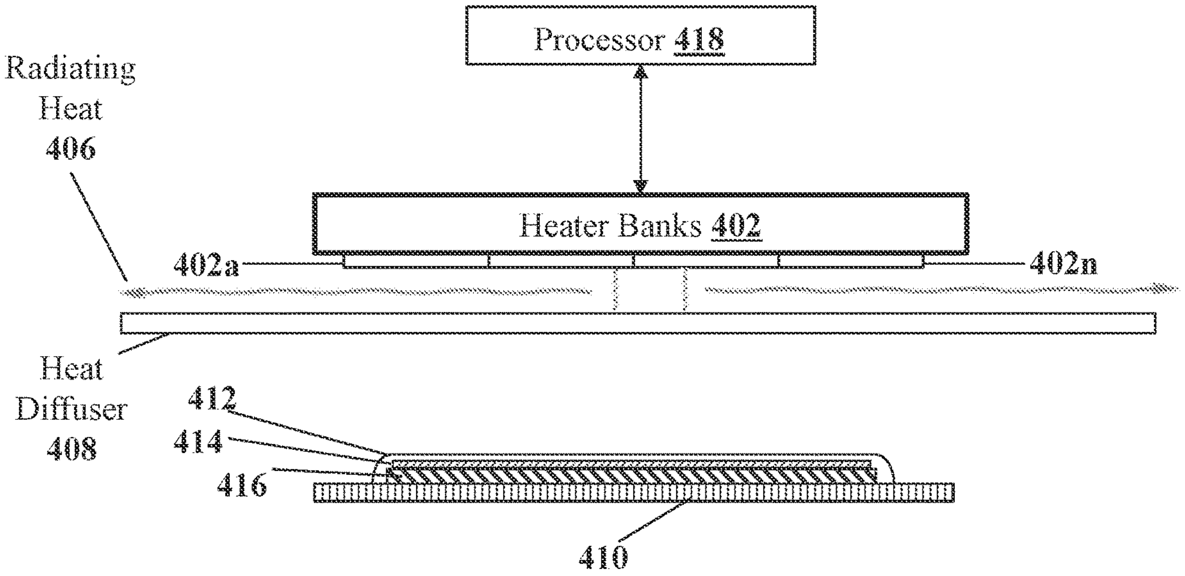
FIG. 4 shows an illustrative heating section of a dye sublimation apparatus, according to an embodiment.

FIG. 4 shows an illustrative heating section 400 of a dye sublimation apparatus with a sealed chamber, according to an embodiment. It should be understood that the components of the heating section 400 shown in FIG. 4 and described herein are merely illustrative and additional, alternative, and fewer number of components should also be considered within the scope of this disclosure. The heating section 400 may comprise a bank of a plurality of heaters 402*a*, 402*b*, 402*c*, . . . 402*n* (collectively referred to as heater banks 402) that may generate radiating heat (also referred to as radiative heat) 406. The radiative heat 406 is redirected and dispersed by the heat diffuser 408 within the heating section 400, which provides heat energy to the entire heating section. This indirect heat may cause dyes in a printed sheet 414 to sublimate and get deposited to a substrate 416 thereby infusing an image on the printed sheet 414 into the substrate 416. As shown, the substrate 416 may be on a bed 410, and the combination of the printed sheet 414 and the substrate 416 may be under a membrane 412, which may snugly hold the printed sheet 414 and the substrate 416.

The heater banks 402 may include any type of heating element that may generate the radiating heat 406. For example, the heater banks 402 may include an electric heating element such as a heating coil that can be controlled by a controller. In other embodiments, the heater banks 402 may include gas-powered heaters that can be controlled by a controller through the throttling of gas flow to the heater banks 402. As another example, the heater banks 402 may include a chemical heating element that may chemically generate the radiating heat 406. It should be understood that these forms of heating are merely illustrative and any type of mechanism that generates the radiating heat 406 should be considered within the scope of this disclosure.

The processor 418 may utilize the temperature measurements provided by one or more sensors to regulate the heater banks 402. For example, if the sensors measure a lower temperature in the heating section 400, the processor 418 may cause the heaters to increase the radiating heat 406. Generally, there may be a continuous feedback-control loop between the sensors, the processor 418, and the heater banks 402.

Figure 5:
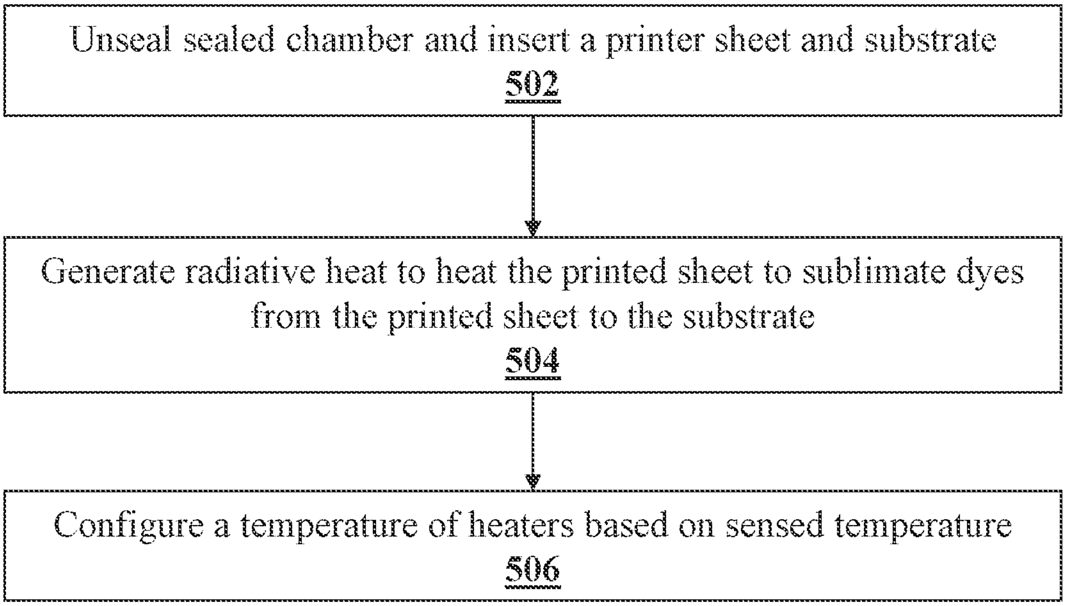
FIG. 5 shows a flow diagram of an illustrative method for dye sublimation, according to an embodiment.

FIG. 5 shows a flow diagram of an illustrative method 500 for dye sublimation, according to an embodiment. The steps of the method 500 described herein are merely illustrative and methods with alternative, additional, and fewer number of steps should also be considered within the scope of this disclosure.

The method may begin at step 502 where a sealed chamber of a dye sublimation apparatus (also referred to as a dye sublimation machine) is unsealed through the opening of a door or slot. Once the sealed chamber is opened, a substrate and printed sheet are inserted, and the sealed chamber is re-sealed.

At step 504, a plurality of heating elements may generate radiative heat (also referred to as radiating heat), which is redirected throughout the sealed chamber to heat a printed sheet to sublimate dyes from the printed sheet to a substrate. The heating elements may be configured as bank of heaters or may be multiple banks of heaters. Generally, the printed sheet that may be pressed onto a substrate using a vacuum pulled membrane, and the redirected energy from the heating elements heats the printed sheet and substrate.

At step 506, a processor may configure a temperature of the plurality of heaters in response to a sensed temperature of the sealed chamber. It should be understood that the term "processor" as used herein may include microprocessors that generate control instructions and controllers that generate control signals. In some embodiments, the processor may maintain a target temperature for the sealed chamber throughout the sublimation cycle. In other embodiments, the processor may dynamically configure the temperature for the sealed chamber during the sublimation cycle.

The foregoing method descriptions and the process flow diagrams are provided merely as illustrative examples and are not intended to require or imply that the steps of the various embodiments must be performed in the order presented. The steps in the foregoing embodiments may be performed in any order. Words such as "then," "next," etc. are not intended to limit the order of the steps; these words are simply used to guide the reader through the description of the methods. Although process flow diagrams may describe the operations as a sequential process, many of the operations can be performed in parallel or concurrently. In addition, the order of the operations may be re-arranged. A process may correspond to a method, a function, a procedure, a subroutine, a subprogram, and the like. When a process corresponds to a function, the process termination may correspond to a return of the function to a calling function or a main function.

The various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of this disclosure or the claims.

Embodiments implemented in computer software may be implemented in software, firmware, middleware, microcode, hardware description languages, or any combination thereof. A code segment or machine-executable instructions may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc.

The actual software code or specialized control hardware used to implement these systems and methods is not limiting of the claimed features or this disclosure. Thus, the operation and behavior of the systems and methods were described without reference to the specific software code being understood that software and control hardware can be designed to implement the systems and methods based on the description herein.

When implemented in software, the functions may be stored as one or more instructions or code on a non-transitory computer-readable or processor-readable storage medium. The steps of a method or algorithm disclosed herein may be embodied in a processor-executable software module, which may reside on a computer-readable or processor-readable storage medium. A non-transitory computer-readable or processor-readable media includes both computer storage media and tangible storage media that facilitate transfer of a computer program from one place to another. A non-transitory processor-readable storage media may be any available media that may be accessed by a computer. By way of example, and not limitation, such non-transitory processor-readable media may comprise RAM, ROM, EEPROM, CD-ROM or other optical disk storage, magnetic disk storage or other magnetic storage devices, or any other tangible storage medium that may be used to store desired program code in the form of instructions or data structures and that may be accessed by a computer or processor. Disk and disc, as used herein, include compact disc (CD), laser disc, optical disc, digital versatile disc (DVD), floppy disk, and Blu-ray disc where disks usually reproduce data magnetically, while discs reproduce data optically with lasers. Combinations of the above should also be included within the scope of computer-readable media. Additionally, the operations of a method or algorithm may reside as one or any combination or set of codes and/or instructions on a non-transitory processor-readable medium and/or computer-readable medium, which may be incorporated into a computer program product.

The preceding description of the disclosed embodiments is provided to enable any person skilled in the art to make or use the embodiments described herein and variations thereof. Various modifications to these embodiments will be readily apparent to those skilled in the art, and the generic principles defined herein may be applied to other embodiments without departing from the spirit or scope of the subject matter disclosed herein. Thus, the present disclosure is not intended to be limited to the embodiments shown herein but is to be accorded the widest scope consistent with the following claims and the principles and novel features disclosed herein.

While various aspects and embodiments have been disclosed, other aspects and embodiments are contemplated. The various aspects and embodiments disclosed are for purposes of illustration and are not intended to be limiting, with the true scope and spirit being indicated by the following claims.

What is claimed is:

1. A dye sublimation method for infusing an image on a printed sheet to a substrate, the method comprising:

sealing, via a sealed chamber of a dye sublimation apparatus defining an enclosed space, the printed sheet and the substrate in the enclosed space;

heating, by a heating section of the dye sublimation apparatus positioned within the enclosed space, the printed sheet and the substrate, such that one or more dyes travel to the substrate in a gaseous state and deposit into the substrate in a solid state to infuse the image into the substrate; and the heating section further comprising one or more heaters configured to radiate heat throughout the sealed chamber, wherein the one or more heaters comprises:

a first heater positioned within the sealed chamber above the printed sheet and the substrate;

a first diffuser positioned below the first heater and above the printed sheet and the substrate, the first diffuser configured to redirect heat energy from the first heater;

a second heater positioned within the sealed chamber below the printed sheet and the substrate; and a second diffuser positioned above the second heater and below the printed sheet and the substrate and configured to redirect heat energy from the second heater.

2. The dye sublimation method of claim 1, wherein the sealed chamber is thermally insulated and substantially airtight to keep heat energy from the heating section within the sealed chamber.

3. The dye sublimation method of claim 1, wherein sealing, via the sealed chamber, the printed sheet and the substrate in the enclosed space further comprises:

opening, via one or more adjustable openings of the dye sublimation apparatus, the sealed chamber to receive the printed sheet and the substrate into the enclosed space defined by the sealed chamber; and closing, via the one or more adjustable openings, the sealed chamber to maintain a seal of the enclosed space of the sealed chamber.

4. The dye sublimation method of claim 1, wherein the one or more heaters are at least one of a gas-power heater, electric-powered heater, or a chemical heater.

5. The dye sublimation method of claim 1, further comprising:

transmitting, via a controller of the dye sublimation apparatus, control signals to the one or more heaters.

6. The dye sublimation method of claim 1, wherein the one or more heaters are configured to maintain a uniform or approximately uniform temperature within the sealed chamber.

7. The dye sublimation method of claim 1, further comprising:

relieving, by one or more outlets of the dye sublimation apparatus, a pressure in the sealed chamber.

8. The dye sublimation method of claim 7, further comprising:

transmitting, via a controller of the dye sublimation apparatus, control signals to the one or more outlets based on a temperature within the enclosed space of the sealed chamber.

9. The dye sublimation method of claim 1, the one or more heaters each comprising one or more heating elements and one or more diffusers configured to redirect heat energy from the heating elements.

10. The dye sublimation method of claim 9, wherein heat energy is provided to the printed sheet and the substrate without directly heating the printed sheet and the substrate.

* * * * *